(12) United States Patent
Spiegelman (10) Patent No.: US 12,460,293 B2
(45) Date of Patent: Nov. 4, 2025

(54) GAS RECOVERY SYSTEMS AND METHODS

(71) Applicant: RASIRC, Inc., San Diego, CA (US)

(72) Inventor: Jeffrey J. Spiegelman, San Diego, CA (US)

(73) Assignee: RASIRC, Inc., San Diego, CA (US)

( * ) Notice: Subject to any disclaimer, the term of this patent is extended or adjusted under 35 U.S.C. 154(b) by 273 days.

(21) Appl. No.: 18/333,714

(22) Filed: Jun. 13, 2023

(65) Prior Publication Data

US 2023/0407470 A1 Dec. 21, 2023

Related U.S. Application Data

(60) Provisional application No. 63/366,684, filed on Jun. 20, 2022.

(51) Int. Cl.
| | |
|---|---|
| B01D 53/047 | (2006.01) |
| B01D 53/14 | (2006.01) |
| C23C 16/44 | (2006.01) |
| F02C 1/00 | (2006.01) |
| F02C 9/16 | (2006.01) |
| G03F 7/00 | (2006.01) |

(52) U.S. Cl.
CPC ........ *C23C 16/4412* (2013.01); *B01D 53/047* (2013.01); *B01D 53/14* (2013.01); *F02C 1/00* (2013.01); *F02C 9/16* (2013.01); *G03F 7/70891* (2013.01); *B01D 2258/0216* (2013.01); *F05D 2270/03* (2013.01)

(58) Field of Classification Search
CPC .................. B01D 53/047; B01D 53/14; B01D 2258/0216; C23C 16/4412; F02C 1/00; F02C 9/16; G03F 7/70891; F05D 2270/03
USPC ................................ 95/96, 187; 96/121, 243
See application file for complete search history.

(56) References Cited

U.S. PATENT DOCUMENTS

| | | | |
|---|---|---|---|
| 2003/0143448 A1 | 7/2003 | Keefer | |
| 2004/0098966 A1 | 5/2004 | Dewis | |

(Continued)

FOREIGN PATENT DOCUMENTS

| | | |
|---|---|---|
| CN | 102472161 A | 5/2012 |
| CN | 102959198 A | 3/2013 |
| EP | 2233195 A1 | 9/2010 |

(Continued)

OTHER PUBLICATIONS

International Search Report and Written Opinion dated Sep. 20, 2023 for PCT Patent Application No. PCT/IB2023/056098.

*Primary Examiner* — Frank M Lawrence, Jr.
(74) *Attorney, Agent, or Firm* — MLO, a professional corp.

(57) ABSTRACT

The present disclosure relates to gas recovery systems and methods, and systems including gas recovery systems. In some embodiments, a gas recovery system includes a gas inlet, a compressor, a buffer tank, a variable speed microturbine, one or more sensors, and a control system. A gas input into the gas inlet can be output from a processing tool, and the gas can include hydrogen or ammonia gas. The gas can be used to produce electrical power using the first variable speed microturbine. The sensor, for example, a gas analyzer, a flow meter, or a pressure sensor, can be between the gas inlet and the variable speed microturbine. The control system can be configured to control a speed of the variable speed microturbine in response to a measurement from the sensor.

20 Claims, 4 Drawing Sheets

(56) References Cited

U.S. PATENT DOCUMENTS

2005/0126182 A1* 6/2005 Teets .......................... F02C 3/34
                                                                                60/791
2018/0216532 A1* 8/2018 Smith ........................ F02C 7/10

FOREIGN PATENT DOCUMENTS

| EP | 3266512 A1 | 1/2018 |
| JP | 2012047094 A | 3/2012 |
| JP | 2015503059 A | 1/2015 |
| WO | 2016109730 A1 | 7/2016 |
| WO | 2021097363 A1 | 5/2021 |

* cited by examiner

GAS RECOVERY SYSTEMS AND METHODS

RELATED APPLICATIONS

This application claims priority to U.S. Provisional Application No. 63/366,684, filed on Jun. 20, 2022, and entitled "Hydrogen Recovery"; the contents of which is hereby incorporated by reference in full.

BACKGROUND

Industrial processes often exhaust gases that are disposed of by burning or releasing the gases into the atmosphere. For example, semiconductor processing tools, such as photolithography tools and epitaxial growth tools, can exhaust hydrogen gas, ammonia gas, or mixtures of hydrogen gas, ammonia gas, and an inert gas such as nitrogen.

Microturbines are gas turbines that can use a gaseous or liquid fuel to produce electrical power. Microturbines can include an upstream rotating gas compressor, a combustor, and a downstream turbine on the same shaft as the compressor. Microturbines typically produce from 25 kW to 500 kW, and can include magnetic generators to produce the electrical power.

SUMMARY

The present disclosure relates to gas recovery systems, and systems including gas recovery systems. In some embodiments, a gas recovery system comprises: a gas inlet, wherein a gas input into the gas inlet comprises a gas output from a processing tool, and wherein the gas output from the processing tool comprises hydrogen or ammonia gas; a compressor and a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor; a first variable speed microturbine coupled to the buffer tank for case (a) or the compressor for case (b); a sensor, between the gas inlet and the first variable speed microturbine, the sensor comprising a gas analyzer, a flow meter, or a pressure sensor; and a control system coupled to the sensor and the first variable speed microturbine, wherein the control system is configured to control a first speed of the first variable speed microturbine in response to a measurement from the sensor.

In some embodiments, a method comprises: supplying a gas into a gas inlet, wherein the gas comprises a gas output from a processing tool, and wherein the gas output from the processing tool comprises hydrogen or ammonia gas; changing a pressure of the gas using a compressor; storing the gas in a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor; producing electrical power using a first variable speed microturbine coupled to the compressor or the buffer tank; measuring a property of the gas using a sensor comprising a gas analyzer, a flow meter, or a pressure sensor; and controlling, using a control system coupled to the sensor and the first variable speed microturbine, a first speed of the first variable speed microturbine in response to the measurement of the property of the gas from the sensor.

DETAILED DESCRIPTION

The present disclosure relates generally to gas recovery systems, and systems including gas recovery systems. The gas recovery systems described herein contain one or more microturbines that utilize a gaseous fuel to produce electricity. In some cases, the gaseous fuel input into the gas recovery systems described herein can be a gas (e.g., a mixture of gases) output from one or more process tools, such as from one or more semiconductor process tools. The microturbines gas recovery systems described herein can utilize the gas output from the process tool(s) as gaseous fuel to produce electricity, rather than burning (or flaring) the gas or releasing it into the atmosphere.

An advantage of the gas recovery systems described herein is that they can improve the efficiency of a processing plant (e.g., a semiconductor fab) by utilizing the gas output from one or more processing tools to produce electricity instead of the gas output being wasted. This is advantageous because it can reduce the environmental impact, such as $CO_2$ emissions resulting from electricity use, and emissions of the gas output itself. In some cases, waste heat from the gas recovery system (e.g., generated by the microturbines) can also be captured to further improve the efficiency and further reduce the environmental impact of the processing plant.

The gas recovery systems described herein can utilize hydrogen (e.g., pure hydrogen, or hydrogen with some impurities), ammonia gas, or mixtures of hydrogen and nitrogen, or mixtures of hydrogen and ammonia gas, or mixtures of hydrogen, ammonia gas, and other gases, as the fuel from which to produce the electricity. For example, the gas input to the gas recovery system can be a mixture of hydrogen and natural gas, a mixture of hydrogen and nitrogen, a mixture of hydrogen and other gases, or a mixture of hydrogen, ammonia gas, and other gases, and the microturbines can use the gas as fuel to produce the electricity.

The gas recovery systems described herein can be configured to accommodate changes in the gas output from the processing tool(s). In some cases, the gas recovery systems described herein are not configured to provide feedback to the process tool(s). For example, the gas recovery systems described herein may not be configured to send control signals to the process tool(s) to change the gas output(s) from the process tool(s).

The gas recovery systems described herein can include redundant microturbines which can enable the gas recovery system to accommodate (or recover, or utilize) the gas output from one or more process tools without impacting the operation (or uptime) of the process tool(s). For example, a semiconductor fab can contain two or more extreme ultraviolet (EUV) photolithography tools, which output a mixture of hydrogen and nitrogen gas, and a gas recovery system to convert the output gas to electricity. In some cases, the gas recovery system can include two or more microturbines that can be controlled (e.g., brought online or offline, or adjusted to accept different flows of gaseous fuel) to produce electricity from the gas output as the gas output from the EUV photolithography tools changes. Another advantage of redundant microturbines is that if one of the microturbines is offline (e.g., in need of repair or preventative maintenance), then the gas recovery system can utilize the remaining microturbine(s) that are online to produce electricity from the gas output from the process tool(s). In some cases, the microturbine(s) can be adjusted (e.g., run at different speeds) such that they consume as much gas as the semiconductor tools produce, and the semiconductor tools are not prevented from operating at maximum efficiency (or with maximum uptime). In some cases, the microturbine(s) consume all of the output gas from the process tools and no other back up waste treatment of hydrogen exhaust (e.g., flaring) or other gases exhausted is needed in addition to the microturbine(s).

The gas recovery systems described herein can include control systems that control the components of the systems (e.g., compressors, valves, microturbines, etc.) in response to feedback from sensors and/or information from the components (e.g., buffer tanks, compressors, valves, microturbines, etc.). The control systems can include processors (or computers, or servers) that are coupled to the components and sensors using electrical couplings (e.g., wires or wirelessly). The control systems can include data storage (e.g., memory storage devices, or storage devices in the cloud) to store instructions for controlling the components of the system and/or data from the components or from the sensors. In some cases, the sensors can include sensors to measure gas flow (e.g., flow meters positions between components), gas pressure (e.g., pressure transducers in or between components), gas composition (e.g., gas analyzers), and/or temperature (e.g., a thermocouple or other temperature sensor in a microturbine combustion chamber). For example, the sensor(s) can be placed anywhere in the system (e.g., between a gas inlet and a microturbine), and the sensor(s) can be one or more gas analyzers, one or more flow meters, and/or one or more pressure sensors. Additional examples of gas recovery systems including control systems and sensors are described herein.

Figure 1:
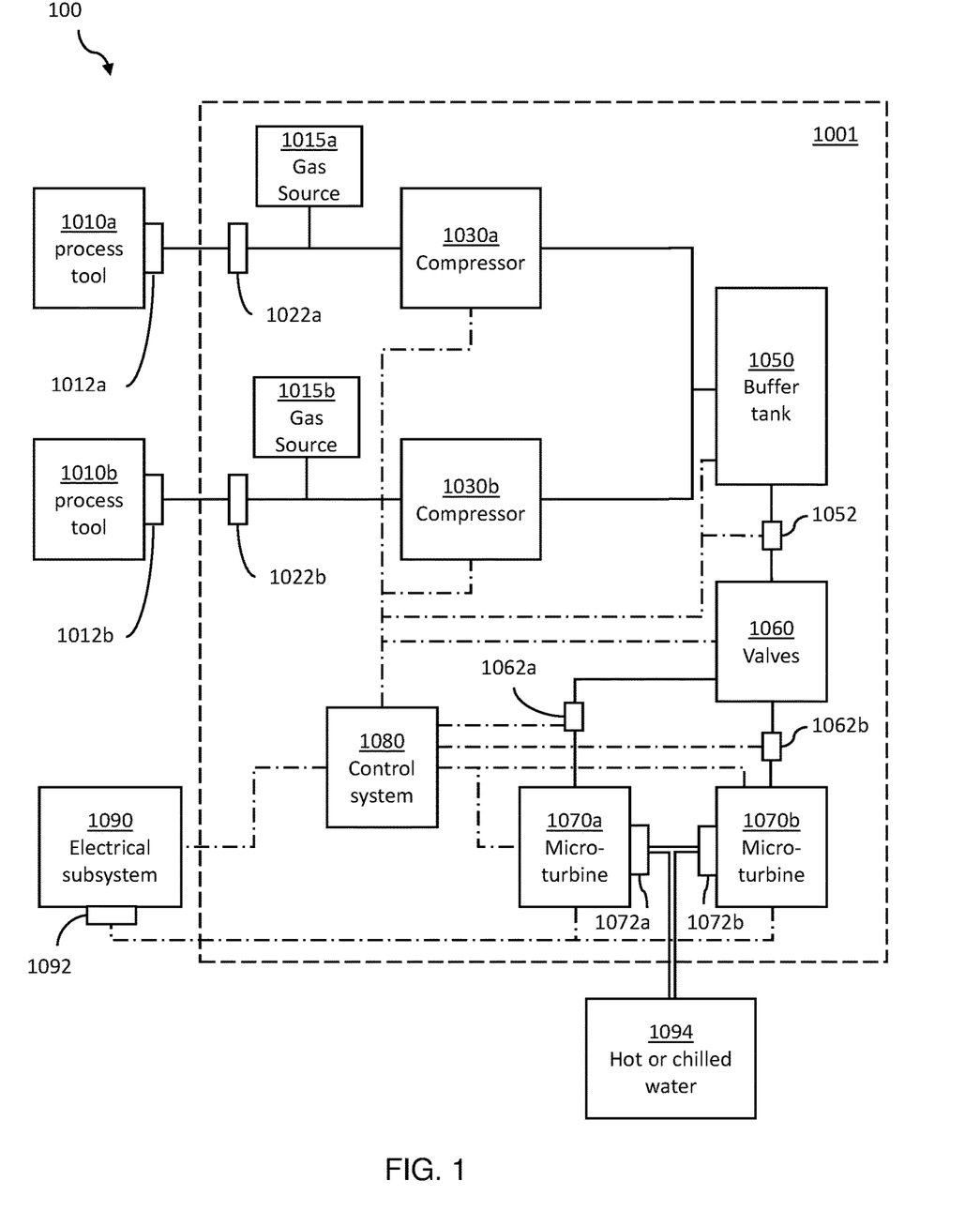
FIG. 1 is a schematic of system including a gas recovery system, in accordance with some embodiments.

FIG. 1 is a schematic of a system 100 including process tools 1010a-b and a gas recovery system 1001, in accordance with some embodiments. The gas recovery system 1001 includes gas inlets 1022a-b, compressors 1030a-b, a buffer tank 1050, set of valves 1060, two microturbines 1070a-b, and a control system 1080. Set of valves 1060 can include one valve or more than one valve (e.g., from 2 to 10 valves) arranged to direct gas flow to microturbines 1070a-b (e.g., in response to commands from the control system 1080). Therefore, in some cases set of valves 1060 comprises a single valve capable of directing the gas flow to different components and/or adjusting the flow rate of the gas through the valve.

Figure 2:
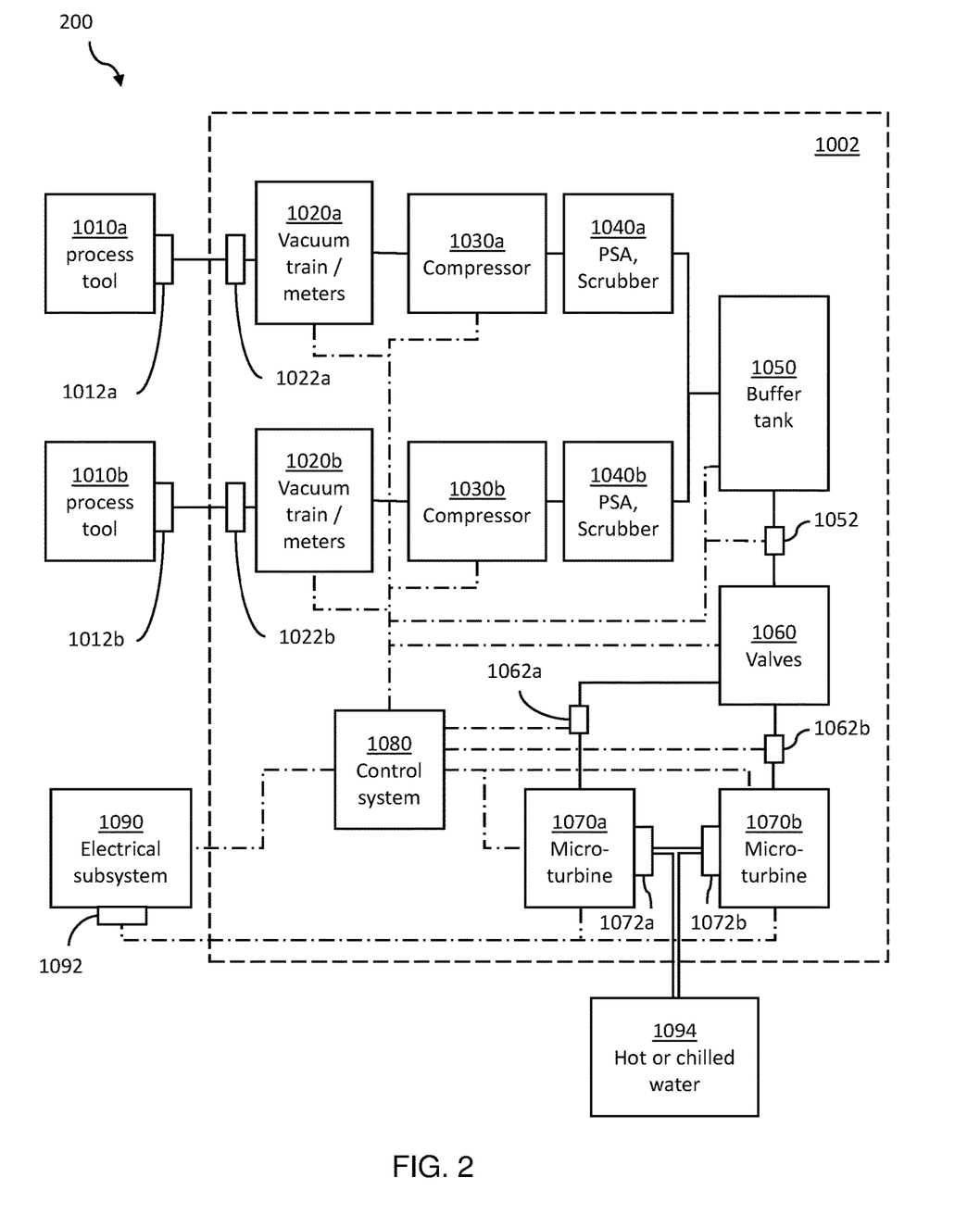
FIG. 2 is a schematic of a system including a gas recovery system with an optional vacuum train and/or an optional pressure-swing absorption (PSA) purifier/scrubber, in accordance with some embodiments.

FIG. 2 is a schematic of a system 200 including process tools 1010a-b and a gas recovery system 1002, in accordance with some embodiments. The gas recovery system 1002 includes all of the components of gas recovery system 1001 in FIG. 1, and further includes optional vacuum trains 1020a-b (optionally including meters such as flow meters and gas analyzers), and optional pressure swing adsorption (PSA) purifiers and/or scrubbers 1040a-b.

Figure 3:
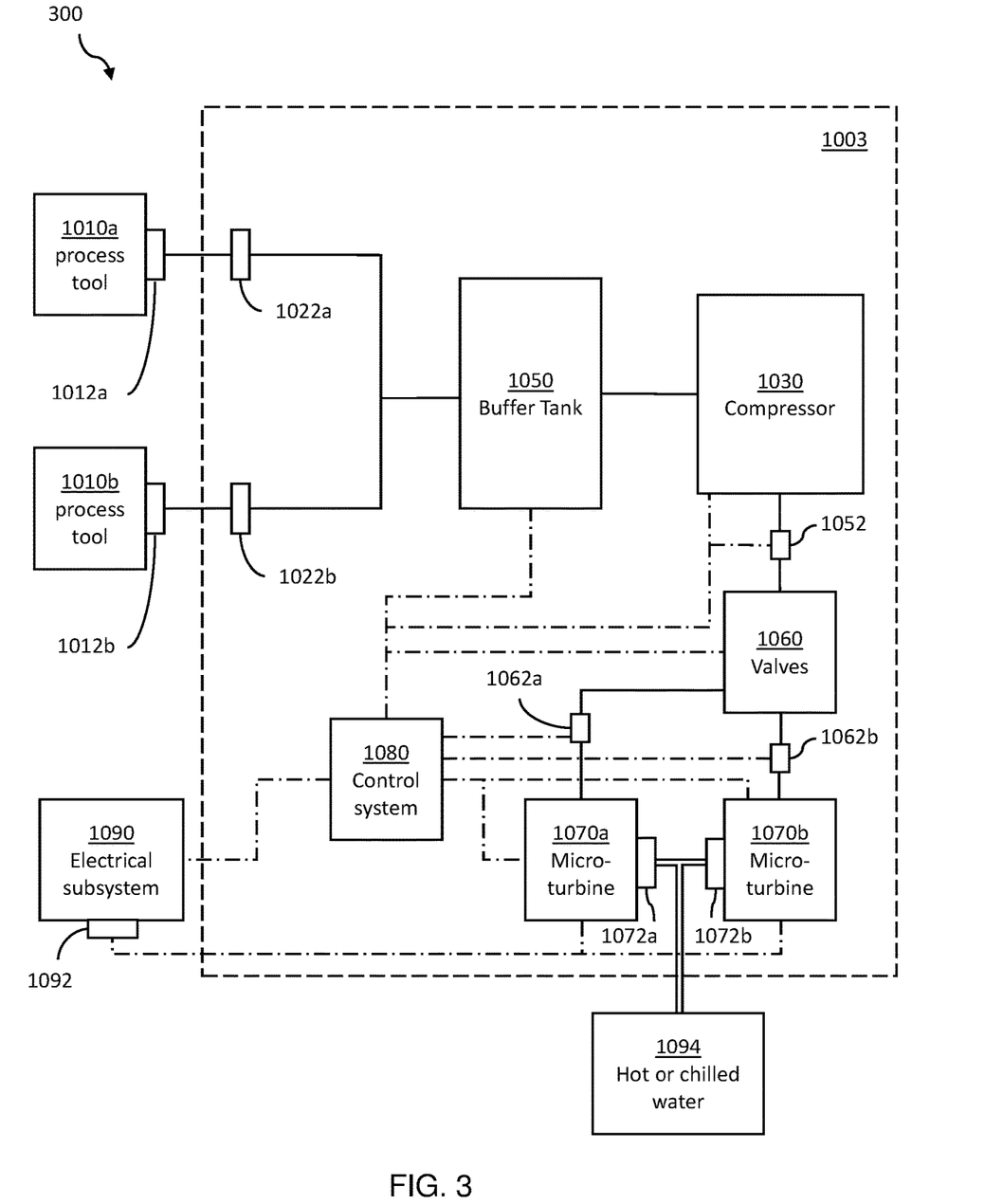
FIG. 3 is a schematic of a system including a gas recovery system with a compressor downstream from a buffer tank, in accordance with some embodiments.

FIG. 3 is a schematic of a system 300 including a gas recovery system 1003, in accordance with some embodiments. Gas recovery system 1003 is similar to gas recovery system 1001 in FIG. 1 and has similar components, however, the buffer tank 1050 is before the compressor 1030 in this example. Gas recovery system 1003 can also optionally include vacuum trains (optionally including meters such as flow meters and gas analyzers) (e.g., as shown by 1020a-b in FIG. 2), and optional PSA purifiers and/or scrubbers in the positions described herein (e.g., as shown by 1040a-b in FIG. 2).

Figure 4:
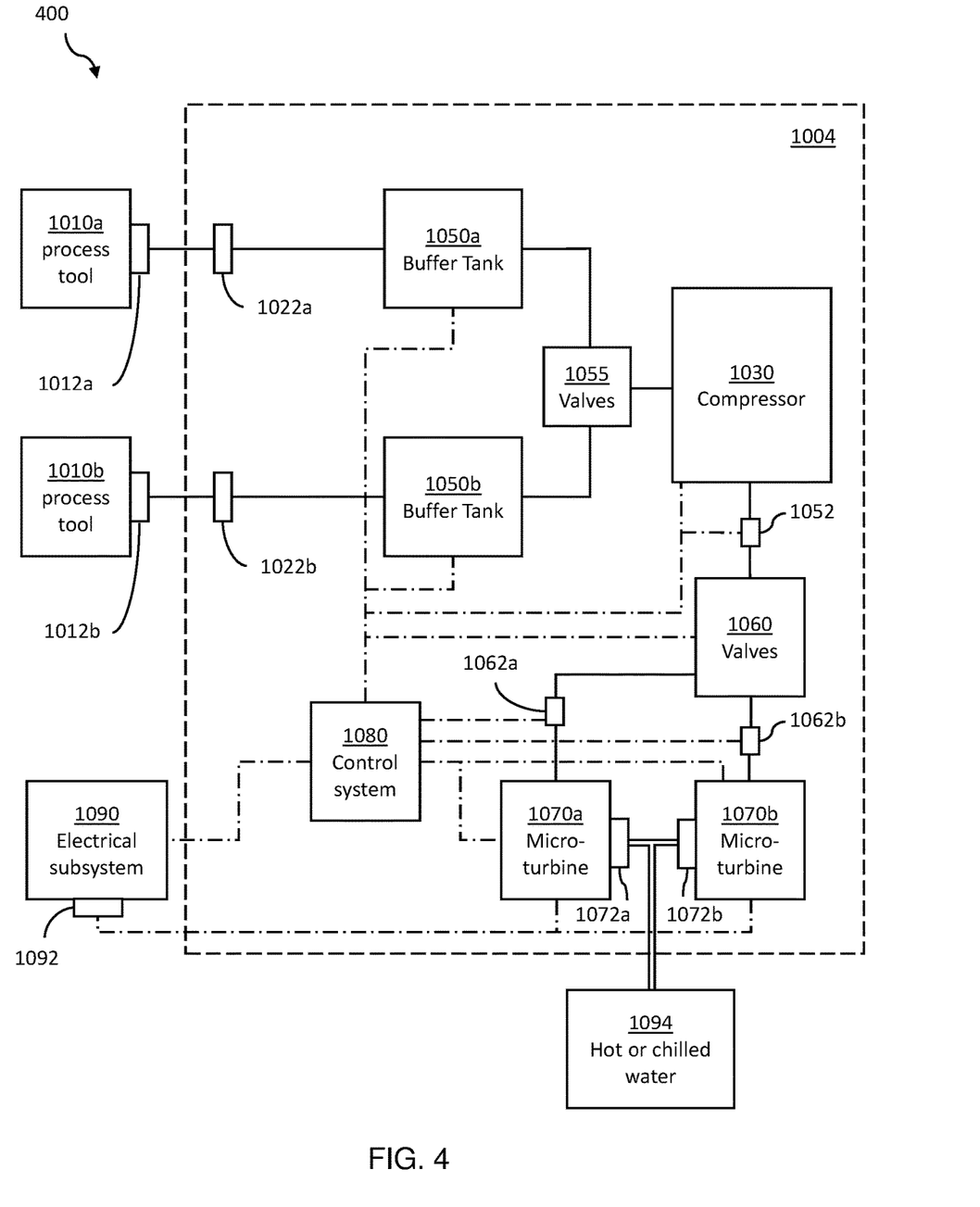
FIG. 4 is a schematic of a system including a gas recovery system with more than one buffer tank, in accordance with some embodiments.

FIG. 4 is a schematic of a system 400 including a gas recovery system 1004, in accordance with some embodiments. Gas recovery system 1004 is similar to gas recovery system 1003 in FIG. 3 and has similar components, however, there are two buffer tanks 1050a and 1050b, and a second set of valves 1055, in this example. The two buffer tanks in system 400 allow for the gases from process tools 1010a and 1010b to be stored separately, and for the gases to be mixed, for example using a set of valves 1055, before using the gas as fuel by microturbines 1070a-b. Gas recovery system 1004 can also optionally include vacuum trains (optionally including meters such as flow meters and gas analyzers) (e.g., as shown by 1020a-b in FIG. 2), and optional PSA purifiers and/or scrubbers in the positions described herein (e.g., as shown by 1040a-b in FIG. 2). The descriptions of buffer tank 1050 in this disclosure also apply to buffer tanks 1050a-b. Set of valves 1055 can include one valve or more than one valve (e.g., from 2 to 10 valves) arranged to direct gas flow to compressor 1030 from buffer tanks 1050a-b (e.g., in response to commands from the control system 1080). Therefore, in some cases set of valves 1055 comprises a single valve capable of directing the gas flow to different components and/or adjusting the flow rate of the gas through the valve.

A microturbine, as used herein, is a gas turbine (or a combustion turbine), including an upstream rotating gas compressor, a combustor, and a downstream turbine on the same shaft as the compressor. Microturbines can use a gaseous or liquid fuel to produce electrical power, for example, from waste gases that would otherwise be flared or released into the atmosphere. Microturbines typically produce from 25 kW to 500 kW, but in some cases, they can produce power greater than 500 kW (e.g., from 500 kW to 1 MW, or greater than 1 MW). Microturbines can include magnetic generators to convert the rotational motion of the turbine into the electrical power.

Gas conduits couple outputs 1012a-b of process tools 1010a-b to inlets 1022a-b of gas recovery systems 1001-1004, shown in FIGS. 1-4, respectively. The gas conduits are shown in the schematics in FIGS. 1-4 as solid lines. The gas conduits also transfer the gas between different components of the gas recovery system 1001, 1002, 1003, or 1004. Liquid conduits transfer hot or chilled water 1094 from microturbines 1070a-b, and the liquid conduits are shown in the schematics in FIGS. 1-4 as double lines.

In some embodiments, control system 1080 controls one or more components of the gas recovery systems 1001-1004 (in FIGS. 1-4). Electrical couplings (e.g., wires) couple control system 1080 to components of the gas recovery systems 1001-1004, in which the electrical couplings are shown as dot-dashed lines in the schematics in FIGS. 1-4. Electrical power can also be output from microturbines 1070a-b through electrical couplings to electrical subsystem 1090. Electrical subsystem 1090 can have electrical input 1092 to receive the electrical power generated by microturbines 1070a-b.

A gas (e.g., hydrogen, ammonia gas, hydrogen mixed with nitrogen, hydrogen mixed with gaseous ammonia and other gases, or hydrogen mixed with other gases) is output from the process tools 1010a-b through gas outlets 1012a-b, and input into the gas recovery systems 1001-1004 (in FIGS. 1-4) through gas inlets 1022a-b. Optionally (e.g., as shown in FIG. 2), vacuum trains 1020a-b change the pressure of the gas output from the process tools 1010a-b. Vacuum trains 1020a-b can contain sensors (e.g., flow sensors, gas analyzers and/or pressure sensors) in some embodiments. Compressors 1030a-b increase the pressure of the gas being input to gas recovery systems 1001-1004. Optionally (e.g., as shown in FIG. 2), PSA purifiers and/or scrubbers 1040a-b remove one or more components from the gas and can be located in the processing stream before or after compressors 1030a-b. Buffer tank 1050 stores the gas before sending the gas to microturbines 1070a-b to be converted into electrical energy and/or heat. Set of valves 1060 controls the flow of gas from buffer tank 1050 to microturbines 1070a-b. Set of valves 1060 can comprise a single valve, or more than one valve. Microturbines 1070a-b use the gas as fuel to produce electrical power received by electrical subsystem 1090 and/or for heating or cooling the hot or chilled water 1094. For example, microturbines 1070a-b can contain magnetic generators to produce the electrical power. Control system 1080 can control different components of the gas recovery systems 1001-1004 in response to information from sensors and/or from the components themselves.

In addition to the components shown in FIGS. 1-4, gas recovery systems 1001-1004 (in FIGS. 1-4) may also include additional components that are not shown. For example, valves may be included between any components, such as between PSA purifiers and/or scrubbers 1040a-b and the buffer tank 1050. These additional valves may adjust the flow between components, and may be controlled by control system 1080.

In another example, sensors (e.g., flow sensors, pressure sensors, gas analyzers, etc.) may be included between any components, such as between buffer tank 1050 and set of valves 1060. These additional sensors may detect a property of the gas between components, and may also send information to control system 1080.

In another example, a low-pressure scrubber (e.g., configured to remove condensable components from the gas) can be included before compressors 1030a-b, in addition to PSA purifiers and/or scrubbers 1040a-b that are after the compressors 1030a-b.

The process tools 1010a-b of systems 100, 200, 300 and 400 can be any tools that output a gas (e.g., a mixture of gases) that can be recovered and input into gas recovery systems 1001-1004 (in FIGS. 1-4) through inlets 1022a-b to be used as fuel for an electrical power generation system such as a microturbine. For example, the gas can contain hydrogen or ammonia gas, which can be used as fuel to produce electrical power using a turbine (e.g., a microturbine). In some cases, the gas can contain hydrogen mixed with other gases, such as nitrogen, argon, $NH_3$, silane, dichlorosilane, other substituted silicon compounds, arsine, phosphine, $BCl_3$, gallium volatile compounds, and/or arsenic volatile compounds. In some cases, the gas contains hydrogen and nitrogen, and the concentration of nitrogen is higher than 10%, higher than 20%, higher than 30% higher than 40%, or higher than 50%. For example, the gas can contain about 60% hydrogen and about 40% nitrogen (at 25° C. and atmospheric pressure). In some cases, heat (e.g., for heating or cooling water) can be captured from the electrical power generation system (e.g., microturbine). Process tools 1010a-b can be, for example, semiconductor processing tools (e.g., EUV photolithography, materials deposition, and/or etching tools), microelectronics processing tools, epitaxial film deposition systems (e.g., MOCVD systems), or hydrogen annealing systems.

Vacuum trains 1020a-b (e.g., as shown in FIG. 2) can contain components such as pumps (e.g., mechanical pumps, turbo pumps, etc.) and valves (e.g., butterfly valves, gate valves, etc.), and can change the pressure of the gas output from process tools 1010a-b. Vacuum trains 1020a-b can contain sensors, such as flow sensors, gas analyzers (to measure a chemical composition) and/or pressure sensors, to measure or monitor the properties of the gas, in some embodiments. Information from these sensors can be used by control system 1080 to control components of the gas recovery systems 1001-1004 (in FIGS. 1-4), in some embodiments. For example, compressors 1030a-b and/or microturbines 1070a-b can be controlled (e.g., a speed can be controlled) using control system 1080, based on information from the sensors in vacuum trains 1020a-b. In some cases, vacuum trains 1020a-b contain sensors (e.g., flow sensors, gas analyzers and/or pressure sensors) and do not contain components (e.g., pumps and valves) that change the pressure of the gas output from process tools 1010a-b.

The gas recovery systems 1001-1004 (in FIGS. 1-4) can be configured to accommodate gas pressure of the gas (output from the process tools 1010a-b through gas outlets 1012a-b) from above atmospheric pressure (e.g., 2300 Torr) to ultra-high vacuum ranges (e.g., down to about $10^{-10}$ Torr), for example, ultra-high vacuum (less than $7.5 \times 10^{-10}$ Torr, less than about $10^{-9}$ Torr, or from about $10^{-9}$ Torr to about $10^{-10}$ Torr), high-vacuum (from about $10^{-5}$ Torr to about $10^{-8}$ Torr), medium vacuum (from about $10^{-3}$ Torr to about $10^{-5}$ Torr), low vacuum (from about 1 Torr to about $10^{-3}$ Torr), about atmospheric pressure (about 760 Torr), or above atmospheric pressure (e.g., from about 760 Torr to about 2300 Torr, or more).

The pressure and/or the flow of the gas input into the gas recovery system 1002 through gas inlets 1022a-b can be converted by vacuum trains 1020a-b to pressures and flows that are compatible with compressors 1030a-b. In gas recovery systems 1001-1004 (in FIGS. 1-4), input gas pressure into compressors 1030a-b can be from about 1 psig (pounds per square inch gauge) to 10 psig, and the flow rate of the gas into compressors 1030a-b can be from about 30 scfm (standard cubic feet per minute) to about 60 scfm. Compressors 1030a-b can be chosen based on process tools 1010a-b and may use different input gas pressures and flow rates than the example above. Vacuum trains 1020a-b are optional, and may not be needed in some cases (e.g., as shown in FIG. 1), for example, if the pressure and flow of gas through gas inlets 1022a-b are compatible with compressors 1030a-b.

Compressors 1030a-b increase the pressure of the gas up to a pressure (e.g., about atmospheric pressure, or above atmospheric pressure, or from 50 psig to 150 psig, or about 70 psig) that is compatible with PSA purifiers and/or scrubbers 1040a-b (if present) and microturbines 1070a-b. In some cases, compressors 1030a-b are low pressure compressors capable of converting a pressure (e.g., from about $10^{-2}$ Torr to about $10^{-10}$ Torr, or below about $10^{-2}$ Torr) up to a higher pressure that is compatible with PSA purifiers and/or scrubbers 1040a-b (if present) and microturbines 1070a-b.

Compressors 1030 or 1030a-b can be positioned either before or after the buffer tank in gas recovery systems 1001-1004 (in FIGS. 1-4). The description of compressors 1030a-b in this disclosure also apply to compressor 1030 in FIGS. 3 and 4. For example, gas recovery systems 1001 and 1002 (in FIGS. 1 and 2) have compressors 1030a-b before the buffer tanks 1050. Gas recovery systems 1003 and 1004

(in FIGS. 3 and 4), on the other hand, show examples of a compressor 1030 after buffer tanks 1050 or buffer tanks 1050a-b.

Compressors 1030a-b can be variable speed compressors, in some cases. In such cases, the speed of the compressor can be controlled by control system 1080, for example, in response to information measured by the sensors of vacuum trains 1020a-b. For example, the speed of compressor 1030a can be controlled based on a flow measured by a flow sensor in vacuum train 1020a. In another example, the speed of compressor 1030a can be controlled based on a measured composition of the gas (e.g., a hydrogen concentration, an ammonia gas concentration, or concentrations of hydrogen and nitrogen) measured by a gas analyzer in vacuum train 1020a.

Scrubbers 1040a-b (if present) remove one or more components from the gas output from compressors 1030a-b. For example, the gas output from process tools 1010a-b can include harmful components, volatile components, and/or components that are incompatible with microturbines 1070a-b, and scrubbers 1040a-b can remove such components from the gas before storing the gas in the buffer tank 1050. Scrubbers 1040a-b can be wet scrubbers containing a liquid, or can be dry scrubbers containing dry reagents (e.g., reactive particles mixed with the gas stream). Scrubbers 1040a-b can remove components from the gas such as particulate matter (e.g., particles less than about 10 microns in size), inorganic gases (e.g., $SO_2$, $H_2S$, $H_2O$ and $NH_3$), metal inorganic gases (hafnium chloride, titanium chloride, etc.), chlorinated and/or fluorinated compounds, metal organic compounds (trimethylaluminum (TMA), trimethylgallium (TMG), trimethylindium (TMI), triethylgallium (TEG), etc.) volatile organic compounds (VOCs), polycyclic aromatic hydrocarbons, acids (e.g., HF, HCl), and heavy metals. Scrubbers 1040a-b are not needed in some cases, for example where the gas output from process tools 1010a-b does not contain components to be removed before entering the buffer tank 1050. In some cases, a second low-pressure scrubber (not shown) can be located downstream of vacuum trains 1020a-b and upstream of compressors 1030a-b. Such a low-pressure scrubber can be used to remove condensable components from the gas to avoid condensation of the gas in the compressors 1030a-b.

Pressure swing adsorption (PSA) purifiers 1040a-b (if present) can be used to separate a species of the gas. PSA purifiers can separate species from a pressurized mixture of gases using an adsorbent material, wherein the species is removed by being adsorbed to the adsorbent material. For example, PSA purifiers 1040a-b can be used to reduce nitrogen ($N_2$) gas from a mixture of hydrogen ($H_2$) and nitrogen gases. In some cases, PSA purifiers 1040a-b can be after the compressor in the gas recovery systems described herein to provide pressurized gas to the PSA purifiers 1040a-b. The PSA purifiers 1040a-b can increase the amount of potential hydrogen gas available by removing other species of gases (e.g., nitrogen, argon, $NH_3$, silane, or any of the gases described herein) that are mixed with the hydrogen gas output from the process tool(s) (e.g., 1010a-b). Removing these other gases using a PSA purifier to increase the hydrogen content in the gas can be beneficial for the microturbines 1070a-b. For example, using a gas with higher hydrogen content as fuel can improve the efficiency of microturbines 1070a-b. Higher hydrogen content gas fuel provides more energy to the turbine and allows it to run at higher temperatures. This can also increase the operating range of the turbine, allowing it to run at different speeds. In some cases, the PSA purifiers 1040a-b, when included, can increase the $H_2$ concentration in the gas stream from less than 70% to greater than 90%, greater than 95%, or greater than 99%. The use of PSA purifiers 1040a-b in system 1002 can also beneficially reduce the size of the buffer tank 1050 needed.

In some cases, the scrubbers and/or PSA purifiers 1040a-b described herein can include both scrubbers and PSA purifiers. In such cases, the scrubber(s) can be before the PSA purifier(s) to protect the components of the PSA purifiers (e.g., the beds) from contamination and/or fouling.

Buffer tank 1050 stores the gas output from compressors 1030a-b, and optionally from PSA purifiers and/or scrubbers 1040a-b, before providing the gas to microturbines 1070a-b using set of valves 1060. Buffer tank 1050 can store the gas at pressures (e.g., 50 psig to 70 psig) that are compatible with microturbines 1070a-b. In some cases, buffer tank 1050 can store a volume of gas equal to the volume of gas output by processing tools 1010a-b (e.g., EUV photolithography tools, epitaxy tools, or other tools) in 1 hour (or in 10 min, or in a period of time from 1 min to 1 hour, or in a period of time from 1 min to 10 hours). One buffer tank 1050 can be used to store gas from one or more process tools 1010a-b, and distribute and/or manage the gas flow from the one or more process tools 1010a-b to the one or more microturbines 1070a-b. In cases where there are two microturbines 1070a-b (or more than two microturbines, not shown), then the buffer tank 1050 can be coupled to the set of valves 1060, and different amounts of the gas can be supplied from buffer tank 1050 to each microturbine 1070a-b. Set of valves 1060 can comprise a single valve, or more than one valve to accomplish this. In some cases, buffer tank 1050 can include one or more sensors (e.g., pressure sensors, gas analyzers, etc.) to measure properties of the stored gas, such as the stored volume, the pressure, and/or the chemical composition of the stored gas.

In some cases, gas recovery systems 1001-1004 (in FIGS. 1-4) can use more than one buffer tank in parallel. Having more than one buffer tank can be advantageous, for example, for redundancy in case one buffer tank is taken offline, and/or to increase the storage capacity of the system. In such cases, set of valves 1060 can be coupled to each of the buffer tanks, additional valves can be included upstream of the buffer tanks, and control system 1080 can control the flow of gas to and from the buffer tanks using the valves. In some cases, more than one buffer tank can be used to separate gases that are output from different process tools in different buffer tanks. For example, output gases with different chemical compositions can be kept in separate buffer tanks, each of which is coupled to set of valves 1060 to send the gases to microturbines 1070a-b.

Gas recovery system 1004 (in FIG. 4) shows an example where there are two buffer tanks 1050a-b and a set of valves 1055 to combine the gas from the two buffer tanks 1050a-b before using as a fuel in microturbines 1070a-b. In other cases, there can be more than one buffer tank before or after the compressor in the system (as shown in gas recovery systems 1001-1003 that include only one buffer tank 1050). Set of valves 1055 can include one valve or more than one valve (e.g., from 2 to 10 valves) arranged to direct gas flow from buffer tanks 1050a-b to compressor 1030 (e.g., in response to commands from the control system 1080). Separate buffer tanks (e.g., 1050a-b) can be beneficial in cases where gas composition (e.g., hydrogen to nitrogen ratios, or hydrogen to ammonia gas ratios) are different in the gases output from different process tools (e.g., 1010a-b), for example, due to requirements of the process chambers of the different tools, safety requirements due to flammability or toxicity, or specific vacuum pumping requirements. For example, one or more MOCVD tools and one or more annealing furnaces might both feed a gas recovery system with one or more microturbines, and separate buffer tanks can be used to allow for different compression rates and mixing of gases downstream of the buffer tanks to provide a mixed fuel. In some cases, such a mixed fuel can improve the efficiency of the microturbines using the mixed gas as fuel compared to either of the individual gases alone as fuel, or can enable burning one fuel source with the aid of the other.

Additionally, in cases where process tools 1010a-b output different types of gases (e.g., gases with different chemical compositions, different purities, and/or different pressures) then gas recovery systems 1001-1004 (in FIGS. 1-4) can include different types of vacuum trains 1020a-b, compressors 1030a-b, PSA purifiers and/or scrubbers 1040a-b, buffer tank 1050 (or multiple buffer tanks 1050a-b), and microturbines 1070a-b, to accommodate the different gases from the different process tools.

Set of valves 1060 and set of valves 1055 control the flow of gas in the gas recovery systems 1001-1004 (e.g., from buffer tank 1050 (or more than one buffer tank, if present) to microturbines 1070a-b). Set of valves 1060 or set of valves 1055 can include one or more valves, and gas conduits coupling the one or more valves to each other (e.g., in series, in parallel, in a network, etc.). For example, set of valves 1060 or set of valves 1055 can comprise a single valve capable of directing and/or adjusting the gas flow. The valves comprised in the set of valves 1060 (or valves located elsewhere in gas recovery systems 1001-1004 in FIGS. 1-4, such as set of valves 1055 in FIG. 4) can be any type of valve that can control the flow of the gas, such as butterfly valves, or gate valves. The set of valves 1060, or set of valves 1055, or valves located elsewhere in gas recovery systems 1001-1004 can be controlled by control system 1080, for example in response to information (e.g., gas composition, pressure, or flow rate) from sensors in vacuum trains 1020a-b, information (e.g., compressor speed) from compressors 1030a-b, information (e.g., stored volume and/or gas composition) from buffer tank 1050, and/or information from microturbines 1070a-b. In some cases, the valves in set of valves 1060 or set of valves 1055 are automatically controlled by control system 1080 and/or are manually adjustable.

Microturbines 1070a-b use the gas output from process tools 1010a-b as fuel to produce electrical power. The electrical power can be received by electrical subsystem 1090. Additionally, water can be heated or chilled using microturbines 1070a-b to produce the hot or chilled water 1094. The microturbines 1070a-b can utilize a variety of gases output from process tools 1010a-b as fuel, such as hydrogen, natural gas, associated gas, biogas, liquefied petroleum gas (e.g., propane), liquid fuels (e.g., diesel, kerosene, and aviation fuel), ammonia gas, mixtures thereof. Microturbines 1070a-b can also utilize mixtures of gases including any of the aforementioned gases as fuel. For example, microturbines 1070a-b can utilize mixtures of hydrogen and natural gas, or mixtures of hydrogen and nitrogen, or mixtures of hydrogen and other gases, as fuel. For example, nitrogen can be added to process gases (e.g., those output from process tools 1010a-b) to improve pumping and safety when the process gases contain hydrogen.

In some cases, the gas recovery systems described herein can include one or more sources of gas that can be added to a gas output from the process tools. Gas recovery system 1001 (in FIG. 1) includes gas sources 1015a-b, configured to add one or more additional gases to the process gases output from process tools 1010a-b. For example, gas sources 1015a-b can be used to add nitrogen or water vapor to the gas stream in system 1001. Similarly, gas sources 1015a-b can be added to the other systems described herein to dilute or mix the gas with one or more additional gases. In some cases, gas sources 1015a and 1015b can be different from one another, for example, where the process tools 1010a and 1010b output different gases. Nitrogen can be added to vacuum pumps, compressors, and microturbines to add mass and enable more efficient compression and movement of gas (e.g., hydrogen) through the system. The nitrogen gas in the fuel can be beneficial for microturbines 1070a-b, since it can reduce the heat of combustion for the total gas mix and allow microturbines 1070a-b to run at higher speeds (e.g., higher revolutions per minute (RPM)), which can improve efficiency. In some cases, the nitrogen is managed to prevent NOx formation through control of turbine speed, combustion temperature and/or air feed inside the turbine. Additionally, water vapor can be added to the gas feed to reduce NOx formation.

In some cases, microturbines 1070a-b can be variable speed microturbines. The speed of a variable speed microturbine can be controlled using control system 1080. The speed of the variable speed microturbine can be controlled based on a measurement from a sensor, in some cases. For example, a sensor in the vacuum train 1020a-b (if present) or buffer tank can measure the concentration of nitrogen gas in a mixture of nitrogen gas and hydrogen gas, and change the speed of a variable speed microturbine 1070a-b based on the measured concentration such that microturbines 1070a-b run at higher speeds (e.g., higher revolutions per minute (RPM)) when the nitrogen concentration is above a threshold. This can be beneficial since running a microturbine at higher speeds can improve the efficiency of the microturbine. In another example, a speed of variable speed microturbine 1070a can be controlled using a temperature sensor in microturbine 1070a (e.g., in a combustion chamber), and a speed of variable speed microturbine 1070b can be controlled using a temperature sensor in microturbine 1070b.

Conventionally, microturbines utilize stable or static fuel sources like oil and gas wells or biodigesters. In those cases, the microturbine efficiency is more important than accommodating differences in the source of the fuel, so variable speed microturbines are not beneficial. In contrast, in embodiments described herein, the microturbines are subservient to the process tool(s) and are not allowed to adversely affect tool performance or throughput. In some of the gas recovery systems described herein, variable speed microturbines may at times run at sub-optimum efficiencies (e.g., at speeds that correspond to sub-optimum efficiencies) to accept (or accommodate) the gas output from process tool(s) without adversely affecting conditions of the process tool(s) upstream (e.g., that could load up vacuum pumps and affect the vacuum achieved, or limit gas throughput in the process tool(s)).

In some cases, microturbines 1070a-b can be operated in a follower mode, where a speed of the variable speed microturbines 1070a-b increases or decreases depending on the fuel content and/or feed rate (e.g., as measured by one or more sensors, such as, a gas analyzer, a flow meter, and/or a pressure transducer). This can reduce efficiency at the benefit of greater feed flexibility from process tools and gas collection trains.

Each microturbine 1070a-b can use from 100 slpm (standard liters per minute) to 10,000 slpm of gas as fuel. In some cases, microturbines 1070a-b include air bearings. Two microturbines 1070a-b are shown in gas recovery systems 1001-1004 (in FIGS. 1-4), however, in other cases, there can be one microturbine, more than two microturbines (e.g., 3, 4, 5, 6, 10, 15 or 20 microturbines), or from 1 to 20, or from 1 to 10, or from 2 to 4 microturbines. Microturbines 1070a-b are arranged in parallel in gas recovery systems 1001-1004 for redundancy. Such an arrangement allows control system 1080 to control the microturbines 1070a-b and the flow of gas to microturbines 1070a-b to accommodate the output from process tools 1010a-b, as described herein.

Microturbines 1070a-b can be individually controlled by control system 1080 in response to information from components and/or sensors, for example in response to information (e.g., flow, pressure, gas composition) from sensors in vacuum trains 1020a-b, information (e.g., compressor speed) from compressors 1030a-b, information (e.g., stored volume and/or gas composition) from sensors in buffer tank 1050, and/or information (e.g., gas flow) from set of valves 1060. For example, the microturbine speed can be controlled, as described herein. In microturbines 1070a-b, the fuel source is combusted with air. The feed rate of the air into the microturbine can also be controlled, for example, based on feedback from a sensor in the microturbine or upstream from the microturbine. The feed rate of air into the microturbine can modulate temperature of the microturbine, as well as the NOx emissions.

In some cases, sensors 1062a-b (e.g., flow meters, pressure sensors, or gas analyzers) can be located between set of valves 1060 and microturbines 1070a-b, and control system 1080 can adjust the speed of one or both variable speed microturbines 1070a-b in response to measurements (e.g., flow measurements, pressure measurements, or gas composition measurements) from sensors 1062a-b (or a flow meter in set of valves 1060, or one or more flow meters in vacuum trains 1020a-b). For example, the speed of microturbine 1070a and/or 1070b can be slowed down in response to measurements (e.g., flow measurements, pressure measurements, or gas composition measurements) from sensors 1062a-b being (or dropping) below a threshold.

In some cases, the speed of microturbine 1070a and/or 1070b can be adjusted (e.g., slowed down or sped up) in response to information from a sensor (e.g., a buffer tank sensor) that measures a property (e.g., a chemical composition, or a volume (or pressure)) of the gas. In some cases, gas recovery systems 1001-1004 (in FIGS. 1-4) can include a gas analyzer 1052 located between the buffer tank 1050 and microturbines 1070a-b. Gas analyzer 1052 can also be located at other places in gas recovery systems 1001-1004, such as in vacuum trains 1020a-b, in buffer tank 1050 (or buffer tanks 1050a-b), or at a position between the gas inlets 1022a-b and the microturbines 1070a-b. In such cases, the speed of microturbines 1070a-b can be adjusted (e.g., slowed down or sped up) in response to information from gas analyzer 1052. In some cases, the systems contain more than one buffer tank, and one or more sensor can be used in each of the buffer tanks and/or downstream from each of the buffer tanks to provide information to the control system 1080. In some cases, one or more sensors (e.g., flow meters, pressure sensors, and/or gas analyzers) can be included between compressor 1030 and set of valves 1060.

In some cases, the speed of microturbine 1070a and/or 1070b can be slowed down in response to the volume (or pressure) of gas in buffer tank 1050 dropping below a threshold. In another example, the speed of one or more microturbines can be increased in response to a nitrogen to hydrogen ratio of the gas increasing (as measured by a buffer tank sensor, or gas analyzer 1052), and the speed of the one or more microturbines can be decreased in response to the nitrogen to hydrogen ratio decreasing.

In some cases, the speed of microturbine 1070a and/or 1070b can be changed in response to compressor 1030a-b providing information to control system 1080. For example, sensors in compressors 1030a-b can provide measurements of the gas pressure, gas flow and/or gas composition. For example, sensors in compressors 1030a-b can be used to monitor the temperature of the compressor to prevent pre-combustion in the compressor or to help monitor or prevent hydrogen embrittlement in the pump components. In some cases, the compressor can be controlled based on information measured by sensors of vacuum trains 1020a-b, and one or more operating parameters (e.g., speed) of compressors 1030a-b can be used by control system 1080 to control the speed of microturbine 1070a and/or 1070b.

In some cases, one or more additional microturbines (e.g., microturbines in reserve) can be turned on (or, fuel can be directed to the additional microturbines using set of valves 1060) in response to information from one or more sensors. For example, one or more additional microturbines (e.g., microturbines in reserve) can be turned on in response to the hydrogen content and/or ammonia gas content in the gas increasing above a threshold, to utilize the additional hydrogen and/or ammonia gas. For example, one or more additional microturbines (e.g., microturbines in reserve) can be turned on in response to additional gas flow measured using a sensor in vacuum trains 1020a-b, or to a volume or pressure increasing above a threshold in buffer tank 1050.

In some cases, it is advantageous to keep all of the microturbines in gas recovery systems 1001-1004 (in FIGS. 1-4) running as much as possible, because starting and stopping the microturbines can cause components of the microturbines to wear out more quickly. In such cases, gas recovery systems 1001-1004 can further include one or more additional sources of fuel (e.g., hydrogen tube trailers or a methane feed, not shown) to ensure that enough fuel is available to keep the microturbines running if the gas output from the process tool(s) decreases below a threshold.

In some cases, one or more microturbines (e.g., 1070a) in gas recovery systems 1001-1004 (in FIGS. 1-4) are operated at a high efficiency (e.g., at a speed that corresponds to a high efficiency) and one or more variable speed microturbines (e.g., 1070b) in gas recovery systems 1001-1004 are operated at variable speeds (which may correspond to lower efficiencies) to accommodate a changing supply of gas from buffer tank 1050 (and/or from process tools 1010a-b). In some cases, one or more variable speed microturbines (e.g., 1070a) in gas recovery systems 1001-1004 (in FIGS. 1-4) are operated at a constant speed (e.g., at a speed that corresponds to a high efficiency) and one or more variable speed microturbines (e.g., 1070b) in gas recovery systems 1001-1004 are operated at variable speeds (which may correspond to lower efficiencies) to accommodate a changing supply of gas from buffer tank 1050 (and/or from process tools 1010a-b).

Control system 1080 controls different components of the gas recovery systems 1001-1004 (in FIGS. 1-4). Control system 1080 can include one or more processors (or computers, or servers) that can receive inputs (e.g., from gas recovery system components and/or sensors), process information, and send outputs (e.g., instructions and/or settings to gas recovery system components). Control system 1080 can also contain one or more machine readable storage media (e.g., storage or memory local to the gas recovery system, or remote storage in the cloud) that stores information received by, processed by, or generated by, control system 1080.

Electrical couplings (shown in dot-dashed lines in FIGS. 1-4) couple control system 1080 to other components of gas recovery systems 1001-1004.

Control system 1080 can be coupled to one or more of the vacuum trains 1020a-b (e.g., to components and/or sensors thereof), compressors 1030a-b, buffer tank 1050, set of valves 1060, gas analyzer 1052, sensors 1062a-b (e.g., flow meters, pressure sensors, or gas analyzers), microturbines 1070a-b, electrical subsystem 1090, sensors, and/or valves between the components. Additionally, some components of gas recovery systems 1001-1004 (in FIGS. 1-4) may comprise their own control systems. For example, vacuum trains 1020a-b, compressors 1030a-b, scrubbers 1040a-b, set of valves 1060, and microturbines 1070a-b can each contain their own dedicated control systems. In some cases, control system 1080 can provide instructions to, and/or receive information from the dedicated control systems of components such as vacuum trains 1020a-b, compressors 1030a-b, set of valves 1060, and microturbines 1070a-b. For example, control system 1080 can send a signal to change (reduce or increase) the speed of one or more compressors 1030a-b to a dedicated control system of the one or more compressors 1030a-b in response to information, as described above. For example, control system 1080 can send a signal to change (reduce or increase) the speed of one or more microturbines 1070a-b to a dedicated control system of the one or more microturbines 1070a-b in response to information, as described above.

Electrical subsystem 1090 can receive electrical power output from the microturbines 1070a-b through electrical input 1092. In some cases, electrical subsystem 1090 is part of a processing plant containing process tools 1010a-b, and the electricity produced by microturbines 1070a-b can be utilized by the processing plant to improve the efficiency and/or reduce the environmental impact of the processing plant. In some cases, control system 1080 can be coupled to electrical subsystem 1090. Control system 1080 can receive information from electrical subsystem 1090, and use that information to control one or more components of the gas recovery system, such as set of valves 1060 and/or microturbines 1070a-b. For example, electrical subsystem 1090 can send information about processing tools 1010a-b to control system 1080, and control system 1080 can control one or more components of gas recovery systems 1001-1004 (in FIGS. 1-4) based on the information from electrical subsystem 1090. In some cases, control system 1080 can use information from one or more components of gas recovery systems 1001-1004, such as from set of valves 1060 and/or from microturbines 1070a-b, to control electrical subsystem 1090. For example, electrical subsystem 1090 can be controlled by control system 1080 to direct different amounts of produced electricity to tools of the processing plant based on electrical production rates of microturbines 1070a-b.

Hot or chilled water 1094 can be transferred from microturbines 1070a-b through liquid conduits (shown in FIGS. 1-4 as double lines). Subsystems 1072a-b coupled to microturbines 1070a-b can contain one or more heat exchangers to transfer heat from microturbines 1070a-b to water to produce hot or chilled water 1094. Water can be sent to subsystem 1072a-b, and then can be heated or cooled using the heat from microturbines 1070a-b to form the hot or chilled water 1094. Chilled water 1094 can be produced from the waste heat from microturbines 1070a-b, for example, where subsystems 1072a-b contain refrigeration and/or absorption chiller systems. The heat generated by microturbines 1070a-b can be used to heat or cool water, which can increase the efficiency of the system. For example, hot or chilled water 1094 can be coupled to a processing plant containing process tools 1010a-b, and hot or chilled water 1094 can be utilized by the processing plant to improve the efficiency and/or reduce the environmental impact of the processing plant.

Embodiments

In a first aspect, the present disclosure provides a system including: a first piece of equipment comprising a gas outlet; an output gas from the first piece of equipment output through the gas outlet, the output gas comprising hydrogen and at least 30% nitrogen; a gas recovery system coupled to the gas outlet, the gas recovery system comprising a microturbine; and an electrical subsystem coupled to the gas recovery system, wherein the electrical subsystem comprises an input to receive electrical power generated by the microturbine or a fuel cell from the output gas.

In a second aspect, the present disclosure provides a system including: an extreme ultraviolet (EUV) photolithography tool comprising a gas outlet; a gas recovery system coupled to the gas outlet, the gas recovery system comprising a microturbine; and an electrical subsystem coupled to the gas recovery system, wherein the electrical subsystem comprises an input to receive electrical power generated by the microturbine or a fuel cell from the output gas.

In a third aspect, the present disclosure provides a method including supplying an output gas from a first piece of equipment, wherein the output gas comprises hydrogen and at least 30% nitrogen, and producing electrical power from the output gas using a microturbine.

In a fourth aspect, the present disclosure provides a method including supplying an output gas from an extreme ultraviolet (EUV) photolithography tool, and producing electrical power from the output gas using a microturbine.

In a fifth aspect, the present disclosure provides a system including a first piece of equipment that outputs hydrogen through a hydrogen outlet, and a hydrogen recovery system coupled to the hydrogen outlet, wherein the hydrogen recovery system includes a microturbine or a fuel cell to produce electrical power from the output hydrogen.

In another form of the fifth aspect, the first piece of equipment is configured to produce a semiconductor device.

In another form of the fifth aspect, the first piece of equipment is a semiconductor manufacturing system (e.g., an EUV (extreme ultraviolet) photolithography tool), an epitaxial film deposition system (e.g., an MOCVD system), or a hydrogen annealing system.

In another form of the fifth aspect, the first piece of equipment outputs hydrogen at a low pressure (e.g., any pressure from 760 Torr to below 1 mTorr). The hydrogen recovery system can further include: a vacuum train coupled to the hydrogen outlet of the first piece of equipment; a low-pressure compressor coupled to the vacuum train; a scrubber coupled to the low-pressure compressor, wherein the scrubber is configured to remove particles, condensable components, acid gases, and/or unreacted precursors from the process reaction; an $H_2/N_2$ buffer tank coupled to the scrubber and to the microturbine; and a controller coupled to the buffer tank, wherein the controller is configured to measure and regulate flow of hydrogen from the buffer tank to the microturbine or fuel cell.

In another form of the fifth aspect, the system further includes a subsystem to capture or convert the waste heat generated by the microturbine and to produce hot or chilled water.

In another form of the fifth aspect, the first piece of equipment further comprises a hydrogen inlet. Input hydrogen that is introduced into the first piece of equipment through the hydrogen inlet is partially consumed in a reaction within the first piece of equipment; and the hydrogen output from the system comprises unreacted input hydrogen.

In another form of the fifth aspect, the first piece of equipment further comprises an inlet; and an input material comprising hydrogen is introduced into the first piece of equipment through the inlet and is reacted within the first piece of equipment to produce the output hydrogen.

In a sixth aspect, the present disclosure provides a system, comprising: a processing tool comprising a gas outlet, wherein the gas outlet outputs a gas comprising hydrogen or ammonia gas; a gas recovery system, comprising: a gas inlet coupled to the gas outlet of the processing tool; a compressor coupled to the gas inlet; a buffer tank coupled to the compressor, wherein the buffer tank comprises a buffer tank sensor to measure a property (e.g., chemical composition or volume) of the gas in the buffer tank; at least two microturbines coupled to the buffer tank, wherein the at least two microturbines are each configured to produce electrical power from the gas; a set of valves located between the buffer tank and the at least two microturbines; and a control system coupled to the buffer tank sensor and the set of valves, wherein the control system is configured to open and close each valve of the set of valves to direct the gas from the buffer tank to the at least two microturbines in response to information from the buffer tank sensor.

In another form of the sixth aspect, the processing tool is a semiconductor processing tool.

In another form of the sixth aspect, the processing tool is an epitaxial film deposition system (e.g., an MOCVD system), a hydrogen annealing system, or an extreme ultraviolet (EUV) photolithography tool.

In another form of the sixth aspect, the system further comprising two or more processing tools, wherein the gas recovery system further comprises an additional gas inlet, and an additional compressor, and wherein all of the compressors are coupled to the buffer tank.

In another form of the sixth aspect, the gas comprises at least 30% nitrogen.

In another form of the sixth aspect, the gas recovery system further comprises a vacuum train located between the gas inlet and the compressor.

In another form of the sixth aspect, the gas recovery system further comprises a scrubber located between the compressor and the buffer tank.

In another form of the sixth aspect, the control system is further coupled to the compressor, and wherein the control system is configured to open and close each valve of the set of valves to direct the gas from the buffer tank to the at least two microturbines in response to information from the compressor.

In another form of the sixth aspect, the compressor is a variable speed compressor, and wherein the control system is further coupled to the variable speed compressor, and wherein the control system is configured to adjust a speed of the compressor in response to a flow measured by a flow meter located upstream of the compressor.

In another form of the sixth aspect, the system further comprising a gas analyzer located between the gas inlet and the compressor, wherein the compressor is a variable speed compressor, wherein the control system is further coupled to the gas analyzer, and wherein the control system is configured to adjust a speed of the variable speed compressor in response to a composition of hydrogen measured by the gas analyzer.

In another form of the sixth aspect, each of the at least two microturbines are variable speed microturbines, and wherein the control system is further coupled to the variable speed microturbines, and wherein the control system is configured to adjust a speed of the variable speed microturbines in response to a second flow measured by a second flow meter located upstream of the variable speed microturbines.

In another form of the sixth aspect, the system further comprising a gas analyzer located between the gas inlet and the compressor, wherein each of the at least two microturbines are variable speed microturbines, wherein the control system is further coupled to the gas analyzer, and wherein the control system is configured to adjust a speed of the variable speed microturbines in response to a composition of hydrogen and/or ammonia gas measured by the gas analyzer.

In another form of the sixth aspect, each of the at least two microturbines are variable speed microturbines, wherein the control system is further coupled to the compressor, and wherein the control system is configured to adjust a speed of the variable speed microturbines in response to information from the compressor.

In another form of the sixth aspect, the system further comprising an electrical subsystem coupled to the gas recovery system, wherein the electrical subsystem comprises an input to receive the electrical power generated by the at least two microturbines.

In another form of the sixth aspect, the at least two microturbines enable the system to produce the electrical power from the gas, even when one or more microturbines is offline (e.g., breaks down, or is taken offline for preventative maintenance).

In another form of the sixth aspect, wherein heat from the at least two microturbines is used to heat or cool water.

In a seventh aspect, the present disclosure provides a gas recovery system, comprising: a gas inlet, wherein a gas input into the gas inlet comprises a gas output from a processing tool, and wherein the gas output from the processing tool comprises hydrogen or ammonia gas; a compressor and a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor; a first variable speed microturbine coupled to the buffer tank for case (a) or the compressor for case (b); a sensor, between the gas inlet and the first variable speed microturbine, the sensor comprising a gas analyzer, a flow meter, or a pressure sensor; and a control system coupled to the sensor and the first variable speed microturbine, wherein the control system is configured to control a first speed of the first variable speed microturbine in response to a measurement from the sensor.

In another form of the seventh aspect, the control system is configured to control the first speed of the first variable speed microturbine to accommodate changes in the gas output from the processing tool, and wherein the processing tool is a semiconductor processing tool, an epitaxial film deposition system, a metal organic chemical vapor deposition (MOCVD) system, a hydrogen annealing system, or an extreme ultraviolet (EUV) photolithography tool.

In another form of the seventh aspect, the measurement from the sensor indicates a change in a property of the gas input into the gas inlet due to a change in the gas output from the processing tool.

In another form of the seventh aspect, the system further comprises: a second variable speed microturbine; a set of valves between the buffer tank and the first and second variable speed microturbines, the set of valves configured to direct the gas from the buffer tank to the first and second variable speed microturbines, wherein the control system is further configured to control a second speed of the second variable speed microturbine, and to control the set of valves to direct the gas from the compressor and the buffer tank to the first and second variable speed microturbines in response to the measurement from the sensor.

In another form of the above form of the seventh aspect, the first speed is constant, and wherein the second speed is variable, and wherein the control system is configured to control the second speed of the second variable speed microturbine in response to the measurement from the sensor.

In another form of the seventh aspect, the buffer tank comprises a buffer tank sensor to measure a property of the gas in the buffer tank, and wherein the control system is configured to control the set of valves to direct gas from the buffer tank to the first and second variable speed microturbines in response to information from the buffer tank sensor.

In another form of the seventh aspect, the system further comprises a second gas inlet, and a second compressor, wherein the second compressor is coupled to the second gas inlet and to the buffer tank, wherein a second gas input into the second gas inlet comprises a second gas output from a second processing tool.

In another form of the seventh aspect, the gas input into the gas inlet comprises a mixture of the hydrogen and nitrogen, or a mixture of the hydrogen and the ammonia gas.

In another form of the seventh aspect, the gas recovery system further comprises a pressure swing adsorption purifier or a scrubber located between the compressor and the buffer tank.

In another form of the seventh aspect, the control system is further coupled to the compressor, and wherein the control system is configured to adjust the first speed of the first variable speed microturbine in response to information from the compressor.

In another form of the seventh aspect, heat from the first variable speed microturbine is used to heat or cool water.

In an eighth aspect, the present disclosure provides a method, comprising: supplying a gas into a gas inlet, wherein the gas comprises a gas output from a processing tool, and wherein the gas output from the processing tool comprises hydrogen or ammonia gas; changing a pressure of the gas using a compressor; storing the gas in a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor; producing electrical power using a first variable speed microturbine coupled to the compressor or the buffer tank; measuring a property of the gas using a sensor comprising a gas analyzer, a flow meter, or a pressure sensor; and controlling, using a control system coupled to the sensor and the first variable speed microturbine, a first speed of the first variable speed microturbine in response to the measurement of the property of the gas from the sensor.

In another form of the eighth aspect, the controlling the first speed of the first variable speed microturbine accommodates changes in the gas output from the processing tool, wherein the processing tool is a semiconductor processing tool, an epitaxial film deposition system (e.g., an MOCVD system), a hydrogen annealing system, or an extreme ultraviolet (EUV) photolithography tool.

In another form of the eighth aspect, the measurement from the sensor indicates the change in the property of the gas supplied into the gas inlet due to a change in the gas output from the processing tool.

In another form of the eighth aspect, the method further comprises controlling a second variable speed microturbine using the control system coupled to the second variable speed microturbine to control the second speed of the second variable speed microturbine in response to the measurement from the sensor, wherein the first and second variable speed microturbines are coupled to the compressor or the buffer tank using a set of valves, and wherein the method further comprises controlling the set of valves to direct the gas from the compressor or the buffer tank to the first and second variable speed microturbines in response to the measurement from the sensor.

In another form of the eighth aspect, the first speed is constant and the second speed is variable, and wherein the method further comprises controlling the second speed of the second variable speed microturbine in response to the measurement from the sensor.

In another form of the eighth aspect, the gas comprises a mixture of the hydrogen and nitrogen, or a mixture of the hydrogen and the ammonia gas.

In another form of the eighth aspect, the method further comprises removing one or more components from the gas using a pressure swing adsorption purifier or a scrubber located between the compressor and the buffer tank.

In another form of the eighth aspect, the method further comprises controlling the first variable speed microturbine using the control system to adjust the first speed of the first variable speed microturbine in response to information from the compressor.

In another form of the eighth aspect, the method further comprises heating or cooling water using heat produced by the first variable speed microturbine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

Although the invention has been described with reference to the above example, it will be understood that modifications and variations are encompassed within the scope of the invention. Accordingly, the invention is limited only by the following claims.

What is claimed is:

1. A gas recovery system, comprising:
    a gas inlet, wherein a gas input into the gas inlet comprises a gas output from a processing tool, and wherein the gas output from the processing tool comprises hydrogen or ammonia gas;
    a compressor and a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor;
    a first variable speed microturbine coupled to the buffer tank for case (a) or the compressor for case (b);
    a sensor, between the gas inlet and the first variable speed microturbine, the sensor comprising a gas analyzer, a flow meter, or a pressure sensor; and
    a control system coupled to the sensor and the first variable speed microturbine, wherein the control system is configured to control a first speed of the first variable speed microturbine in response to a measurement from the sensor.

2. The gas recovery system of claim 1, wherein the control system is configured to control the first speed of the first variable speed microturbine to accommodate changes in the gas output from the processing tool, and wherein the processing tool is a semiconductor processing tool, an epitaxial film deposition system, a metal organic chemical vapor deposition (MOCVD) system, a hydrogen annealing system, or an extreme ultraviolet (EUV) photolithography tool.

3. The gas recovery system of claim 1, wherein the measurement from the sensor indicates a change in a property of the gas input into the gas inlet due to a change in the gas output from the processing tool.

4. The gas recovery system of claim 1, further comprising:
    a second variable speed microturbine; and
    a set of valves between the buffer tank and the first and second variable speed microturbines, the set of valves configured to direct the gas from the buffer tank to the first and second variable speed microturbines,
    wherein the control system is further configured to control a second speed of the second variable speed microturbine, and to control the set of valves to direct the gas from the compressor and the buffer tank to the first and second variable speed microturbines in response to the measurement from the sensor.

5. The gas recovery system of claim 4, wherein the first speed is constant, and wherein the second speed is variable, and wherein the control system is configured to control the second speed of the second variable speed microturbine in response to the measurement from the sensor.

6. The gas recovery system of claim 4, wherein the buffer tank comprises a buffer tank sensor to measure a property of the gas in the buffer tank, and wherein the control system is configured to control the set of valves to direct gas from the buffer tank to the first and second variable speed microturbines in response to information from the buffer tank sensor.

7. The gas recovery system of claim 1, further comprising a second gas inlet, and a second compressor, wherein the second compressor is coupled to the second gas inlet and to the buffer tank, wherein a second gas input into the second gas inlet comprises a second gas output from a second processing tool.

8. The gas recovery system of claim 1, wherein the gas input into the gas inlet comprises a mixture of the hydrogen and nitrogen, or a mixture of the hydrogen and the ammonia gas.

9. The gas recovery system of claim 1, wherein the gas recovery system further comprises a pressure swing adsorption purifier or a scrubber located between the compressor and the buffer tank.

10. The gas recovery system of claim 1, wherein the control system is further coupled to the compressor, and wherein the control system is configured to adjust the first speed of the first variable speed microturbine in response to information from the compressor.

11. The gas recovery system of claim 1, wherein heat from the first variable speed microturbine is used to heat or cool water.

12. A method, comprising:
    supplying a gas into a gas inlet, wherein the gas comprises a gas output from a processing tool, and wherein the gas output from the processing tool comprises hydrogen or ammonia gas;
    changing a pressure of the gas using a compressor;
    storing the gas in a buffer tank, wherein either (a) the compressor is coupled to the gas inlet and the compressor is between the gas inlet and the buffer tank, or (b) the buffer tank is coupled to the gas inlet and the buffer tank is between the gas inlet and the compressor;
    producing electrical power using a first variable speed microturbine coupled to the compressor or the buffer tank;
    measuring a property of the gas using a sensor comprising a gas analyzer, a flow meter, or a pressure sensor; and
    controlling, using a control system coupled to the sensor and the first variable speed microturbine, a first speed of the first variable speed microturbine in response to the measurement of the property of the gas from the sensor.

13. The method of claim 12, wherein the controlling the first speed of the first variable speed microturbine accommodates changes in the gas output from the processing tool, wherein the processing tool is a semiconductor processing tool, an epitaxial film deposition system (e.g., an MOCVD system), a hydrogen annealing system, or an extreme ultraviolet (EUV) photolithography tool.

14. The method of claim 12, wherein the measurement from the sensor indicates a change in the property of the gas supplied into the gas inlet due to a change in the gas output from the processing tool.

15. The method of claim 12, further comprising controlling a second variable speed microturbine using the control system coupled to the second variable speed microturbine to control a second speed of the second variable speed microturbine in response to the measurement from the sensor, wherein the first and second variable speed microturbines are coupled to the compressor or the buffer tank using a set of valves, and wherein the method further comprises controlling the set of valves to direct the gas from the compressor or the buffer tank to the first and second variable speed microturbines in response to the measurement from the sensor.

16. The method of claim 15, wherein the first speed is constant and the second speed is variable, and wherein the method further comprises controlling the second speed of the second variable speed microturbine in response to the measurement from the sensor.

17. The method of claim 12, wherein the gas comprises a mixture of the hydrogen and nitrogen, or a mixture of the hydrogen and the ammonia gas.

18. The method of claim 12, further comprising removing one or more components from the gas using a pressure swing adsorption purifier or a scrubber located between the compressor and the buffer tank.

19. The method of claim 12, further comprising controlling the first variable speed microturbine using the control system to adjust the first speed of the first variable speed microturbine in response to information from the compressor.

20. The method of claim 12, further comprising heating or cooling water using heat produced by the first variable speed microturbine.

* * * * *